Patented June 18, 1940

2,204,983

UNITED STATES PATENT OFFICE 2,204,983

DIAMIDINO STILBENES AND PROCESS OF MAKING THEM

Arthur James Ewins, Gidea Park, Romford, and Julius Nicholson Ashley, Upminster, England, assignors to May & Baker, Limited, London, England, a company of Great Britain No Drawing. Application January 24, 1939, Serial No. 252,554. In Great Britain February 1, 1938

5 Claims. (Cl. 260—564)

The present invention relates to the preparation of new stilbene derivatives having trypanocidal properties.

It was previously found that amidine derivatives of numerous diaryl compounds possess marked trypanocidal action.

According to the present invention, it has been found that amidine substituted derivatives of stilbene of the type Am.B.CH.=CH.B.Am. in which Am. is an amidine group and B is a phenyl nucleus, likewise possess trypanocidal properties. The present invention has therefore for its object the preparation of amidine derivatives of stilbene, and substituted stilbenes.

According to the present invention such compounds are prepared from the corresponding cyano derivatives, by treating the latter with anhydrous alcoholic hydrogen chloride or hydrogen bromide whereby the corresponding hydrochlorides and hydrobromides of imino-ethers are formed from which by the action of ammonia or salts thereof the amidines are produced.

The following example illustrates how the invention may be carried out in practice, but it is to be understood that the invention is in no way limited to the details given in this example.

Example: 10 grams of 4,4'-dicyano-stilbene are dissolved in 400 c.c. of boiling nitrobenzene, the hot solution cooled quickly and 25 c.c. of methyl alcohol added. The mixture is saturated with dry hydrochloric acid gas at 0° C., and the solution so obtained left at room temperature for 48 hours. The yellowish brown crystalline di-imino-ether dihydrochloride is filtered off, washed with anhydrous ether, and treated with 600 c. c. of saturated alcoholic ammonia, in a closed vessel at 60° C. for 3 hours. The contents are then evaporated to dryness and the residue dissolved in boiling water. The dihydrochloride of the 4,4'-diamidino-stilbene crystallized on cooling in pale brown needles, M. Pt. about 300° C.

What we claim and desire to secure by Letters Patent is:

1. Process for the preparation of amidine derivatives of the stilbene series of the type Am.B.CH=CH.B.Am. in which Am. represents the amidine group and B represents a phenyl nucleus, by treating dicyano compounds of the stilbene series with a member of the group consisting of anhydrous alcoholic hydrogen chloride and anhydrous alcoholic hydrogen bromide whereby the corresponding imino-ether hydrochlorides and imino ether hydrobromides are formed which are then treated with ammonia whereby they are converted into the amidines.

2. 4,4'-diamidino stilbene.

3. Trypanocidal agents, being compounds selected from the group consisting of 4,4'-diamidino-stilbene and dihydrohalides thereof.

4. Dihydrochloride of 4,4'-diamidino-stilbene.

5. Dihydrobromide of 4,4'-diamidino-stilbene.

ARTHUR JAMES EWINS.
JULIUS NICHOLSON ASHLEY.